United States Patent [19]

Colarelli, III

[11] Patent Number: 5,586,062
[45] Date of Patent: Dec. 17, 1996

[54] VEHICLE WHEEL ALIGNMENT UTILIZING WHEEL OFFSET AND BODY CENTER LINE

[75] Inventor: Nicholas J. Colarelli, III, St. Louis, Mo.

[73] Assignee: Hunter Engineering Company, Bridgeton, Mo.

[21] Appl. No.: 131,153

[22] Filed: Oct. 4, 1993

[51] Int. Cl.$^6$ ............................................. G01B 11/26
[52] U.S. Cl. .................................. 364/559; 33/203.18
[58] Field of Search ..................... 364/559, 424.01; 356/152, 139.09; 33/288, 203.18, 203.15

[56] References Cited

U.S. PATENT DOCUMENTS

| | | | |
|---|---|---|---|
| Re. 33,144 | 1/1990 | Hunter et al. | 356/152 |
| 3,164,910 | 1/1965 | Manlove | 33/203.18 |
| 3,181,248 | 5/1965 | Manlove | 33/203.18 |
| 3,533,699 | 10/1970 | Hopkins et al. | 356/121 |
| 3,554,259 | 1/1971 | Webb | 152/209 A |
| 3,782,831 | 1/1974 | Senften | 356/152 |
| 3,865,492 | 2/1975 | Butler | 356/155 |
| 3,892,042 | 7/1975 | Senften | 33/301 |
| 3,963,352 | 6/1976 | Rishovd et al. | 356/152 |
| 4,095,902 | 6/1978 | Florer et al. | 356/155 |
| 4,097,157 | 6/1978 | Lill | 356/152 |
| 4,126,943 | 11/1978 | Senften | 33/228 |
| 4,138,825 | 2/1979 | Pelta | 33/228 |
| 4,180,326 | 12/1979 | Chang | 356/152 |
| 4,311,386 | 1/1982 | Coetsier | 356/155 |
| 4,319,838 | 3/1982 | Grossman et al. | 356/152 |
| 4,341,021 | 7/1982 | Beissbarth | 33/203.18 |
| 4,381,548 | 4/1983 | Grossman et al. | 364/551 |
| 4,383,370 | 5/1983 | Van Blerk et al. | 33/203.18 |
| 4,523,844 | 6/1985 | Titsworth et al. | 356/152 |
| 4,629,317 | 12/1986 | January et al. | 356/155 |
| 4,761,749 | 8/1988 | Titsworth et al. | 364/559 |
| 5,014,227 | 5/1991 | Kling et al. | 364/559 |
| 5,018,853 | 5/1991 | Hechel et al. | 356/155 |
| 5,056,233 | 10/1991 | Hechel et al. | 33/288 |
| 5,208,646 | 5/1993 | Rogers et al. | 356/152 |
| 5,220,399 | 6/1993 | Christian et al. | 33/288 X |

OTHER PUBLICATIONS

Lee Hunter, "3–Lines", 1978, entire work.
Hunter Engineering Co., "Operation Instructions, System H111/J111 Digital Truck Aligner", 1992, p. 22, Section 10.2.

Primary Examiner—Emanuel T. Voeltz
Assistant Examiner—M. Kemper
Attorney, Agent, or Firm—Polster, Lieder, Woodruff & Lucchesi

[57] ABSTRACT

A vehicle wheel alignment apparatus includes wheel alignment sensors for obtaining wheel alignment data, including camber, and devices for measuring wheel offset distances. A controller compensates the measured wheel offset distances for the camber of the corresponding wheels. Ride height sensors are included for measuring the ride height of the vehicle at the wheels, and the controller also uses the ride height to compensate the wheel offset distances. Ride height is similarly compensated for camber by the controller. The body angle of the vehicle is obtained from the wheel offset measurements and the wheelbase of the vehicle. The body angle is used to compute dog track angles and correct those angles by applying the body angle to the individual toe angles of the reference axle. Axle offsets are computed and used in front axle cradle adjustment if applicable. The body angle is also used to eliminate the effect of wheel offsets from setback angle calculations. The corrected setback angle is converted into a distance when track width is measured.

41 Claims, 9 Drawing Sheets

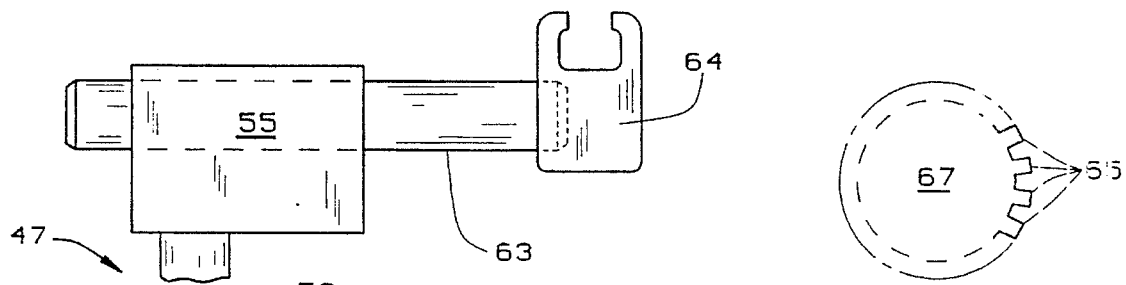
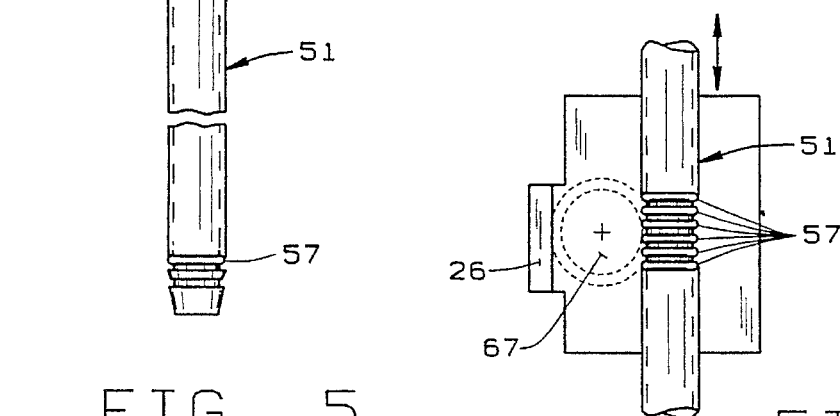
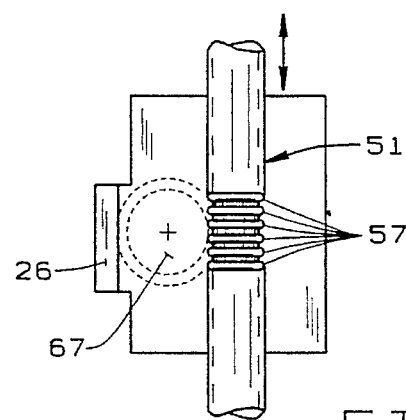
FIG. 5   FIG. 6   FIG. 7
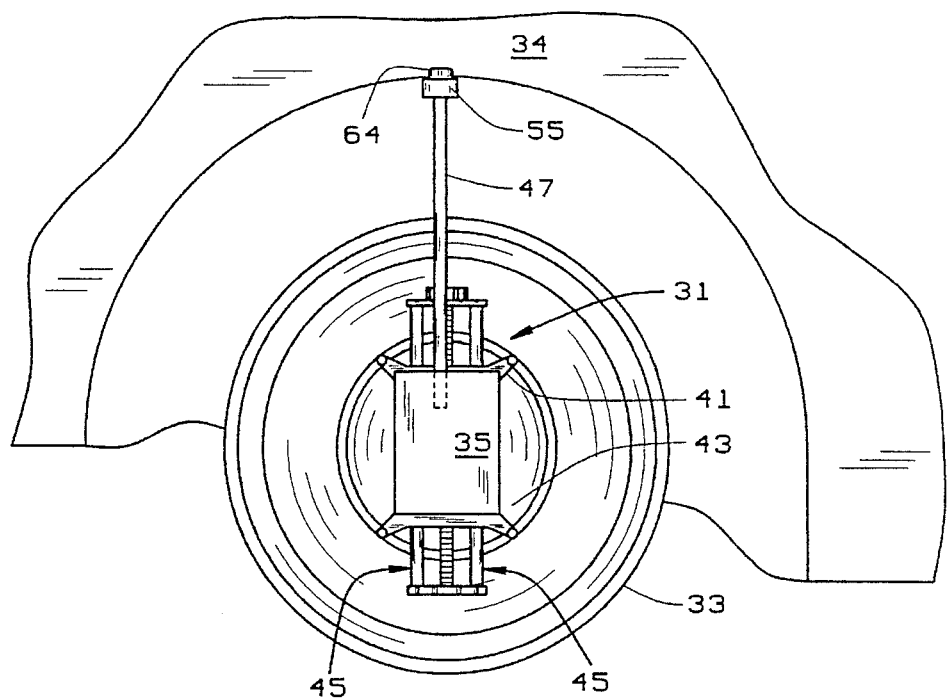
FIG. 8

VEHICLE WHEEL ALIGNMENT UTILIZING WHEEL OFFSET AND BODY CENTER LINE

BACKGROUND OF THE INVENTION

This invention relates to vehicle service apparatus and more particularly to vehicle alignment apparatus utilizing wheel offset and body center line determinations.

It is well known that any vehicle has three lines with respect to which various alignment angles may be measured, namely, the body center line (the longitudinal axis of the vehicle frame), the geometric center line (measured with respect to the wheels and defined as the line connecting two mid-points at the front and rear axles), and the thrust line (a line perpendicular to the average axes of the wheels of the drive axle). The ideal line with which to work is the body center line. Unfortunately it is the least accessible since it depends upon the orientation of the body or frame of the vehicle, while conventional alignment apparatus instead measure the orientation of the wheels of the vehicle. Heretofore, most alignment equipment has simply assumed that the geometric center line and the body center line were coincident because of the difficulty in determining the true body center line.

At least one aligner designed for multi-axle trucks does provide for a determination of the body center line, but that aligner could be improved. Moreover, the procedure used therein is not particularly suitable for smaller vehicles which do not generally have an exposed frame available for reference by the technician/user. In this prior art aligner, strings extend from the front to the rear axles and provide reference lines. Automobile aligners typically have not used strings for many years. The user of this prior art aligner must make a measurement from the string to the truck frame, being careful to make the measurement in a horizontal plane and at a ninety degree angle from the frame. Since the strings are movable and the user must estimate whether the measurement is being taken in a horizontal plane and whether the measurement is being taken at ninety degrees to the frame, this prior art procedure is subject to error and could be improved.

Since the body center line is not readily available to the user, related angles such as a vehicle dog track angle and the vehicle setback angles must be estimated rather than measured.

SUMMARY OF THE INVENTION

Among the various objects and features of the present invention may be noted the provision of an improved vehicle alignment apparatus which allows the user to readily acquire the measurements needed to determine the body center line of a vehicle, particularly of automobiles and light trucks.

Another object is the provision of such an improved apparatus which involves a minimum of additional effort on the part of the technician/user.

A third object is the provision of such an improved apparatus which substantially eliminates human error in its use.

A fourth object is the provision of such an improved apparatus which utilizes body center line measurements to obtain the dog track angle of the vehicle.

A fifth object is the provision of such an improved apparatus which facilitates correction of the thrust angle of the vehicle by taking body angle into account.

A sixth object is the provision of such an improved apparatus which allows ready measurement of axle offset and provides for use of axle offset determinations in performing cradle adjustment procedures.

A seventh object is the provision of such an improved apparatus which allows the setback angle to be corrected for body angle and provides a display of setback distances.

Other objects and features may be in part apparent and in part pointed out hereinafter.

Briefly, in a first aspect a vehicle wheel alignment apparatus of the present invention is used with a vehicle having at least four wheels. It includes wheel alignment sensors for obtaining wheel alignment data, including measured camber data, for at least some of the wheels of a vehicle under test. Offset measuring sensors measure wheel offset distances. And a controller is responsive to the wheel alignment sensors for compensating the measured wheel offset distances for the camber of the corresponding wheels.

In a second aspect of the present invention, a method of aligning vehicles having at least four wheels includes the steps of measuring wheel alignment angles, including camber, for at least some of the wheels of a vehicle under test, measuring wheel offset distances for at least two of the wheels on a predetermined axle, and compensating the measured wheel offset distances for the camber of the corresponding wheels.

In a third aspect of the present invention a vehicle wheel alignment apparatus for use with a vehicle having at least four wheels includes wheel alignment sensors for obtaining wheel alignment data, including measured camber data, for at least some of the wheels of a vehicle under test, and at least one ride height sensor for measuring the ride height of the vehicle at a wheel of the vehicle. A controller is responsive to the wheel alignment sensors and to the ride height sensor for compensating the measured ride height for camber of the wheel corresponding to the measured ride height.

In a fourth aspect of the present invention, a method of aligning vehicles includes the steps of measuring camber for at least one of the wheels of a vehicle under test, measuring the ride height of the vehicle at the wheel of the vehicle, and compensating the measured ride height for camber of the wheel corresponding to the measured ride height.

In a fifth aspect of the present invention, a vehicle wheel alignment apparatus is used with a vehicle having a frame with a longitudinal axis defining the body center line of the vehicle, and at least four wheels. The apparatus includes offset measuring sensors for measuring a wheel offset distance for each of at least four wheels of a vehicle under test, each offset measuring sensor being disposed so as to measure the corresponding wheel offset distance generally in a vertical plane containing the axle of the wheel whose offset distance is being measured. The apparatus determines, from offset distance measurements for at least four predetermined wheels, the body center line of the vehicle under test.

In a sixth aspect of the present invention, a method of aligning vehicles includes the steps of measuring a wheel offset distance for each of at least four wheels of a vehicle under test, each offset distance measurement being taken generally in a vertical plane containing the axle of the wheel whose offset distance is being measured, and determining from the offset distance measurements for at least four predetermined wheels the body center line of the vehicle under test.

In a seventh aspect of the present invention, a vehicle wheel alignment apparatus is used with a vehicle having a frame with a longitudinal axis defining the body center line of the vehicle and at least four wheels. The apparatus includes offset measuring sensors for measuring a wheel offset distance for each of at least four wheels of a vehicle under test, corrects the wheel offset distances for any inclination from horizontal of the planes in which the wheel offset distances were measured and determines from the corrected wheel offset distances the body center line of the vehicle under test.

In an eighth aspect of the present invention, a vehicle wheel alignment apparatus is used with a vehicle having a frame with a longitudinal axis defining the body center line of the vehicle, and at least four wheels. The apparatus includes offset measuring sensors for measuring for each wheel a wheel offset distance from that wheel to a frame reference point for the wheel, which frame reference point is disposed in a plane above the corresponding wheel. The apparatus determines from the measured wheel offset distances for at least four predetermined wheels the body center line of the vehicle under test.

In a ninth aspect of the present invention, a vehicle wheel alignment apparatus is used with a vehicle having a frame with a longitudinal axis defining the body center line of the vehicle, and at least four wheels. The apparatus includes wheel alignment sensors for obtaining wheel alignment data, and ride height sensors for measuring the ride height of the vehicle at each of at least four wheels of the vehicle. The ride height sensors includes wheel offset sensors secured thereto for measuring wheel offset distances for each of the four wheels. The apparatus is responsive to the wheel alignment sensors and the ride height sensor means for determining the body center line of the vehicle under test.

In a tenth aspect of the present invention, a vehicle wheel alignment apparatus is used with a vehicle having a geometric center line defined as the line passing through each vehicle axle at a point equidistant from the nearest opposite pair of wheels on that axle, a body center line defined as the longitudinal axis of the frame of the vehicle, a body angle defined as the angle formed by the intersection of the geometric center line and the body center line of the vehicle, a thrust angle defined as the angle between the geometric center line and a thrust line, the thrust line being defined as a line perpendicular to the average axis of the wheels on a predetermined axle, and at least four wheels. The apparatus includes wheel alignment sensors for obtaining wheel alignment data, offset measuring devices for measuring wheel offset distances, means for supplying a wheelbase value for the vehicle under test, and angle determining circuitry responsive to the wheel alignment sensors and to the supplied wheelbase value for determining the body angle from the wheelbase value and the offset distances. The angle determining circuitry is responsive to the wheel alignment sensors to determine the thrust angle and to determine therefrom the difference between the body angle and the thrust angle, which difference is the dog track angle for the vehicle. A display responsive to the angle determining means displays indicia representative of the dog track angle to the user.

In an eleventh aspect of the present invention, a method of adjusting the alignment of wheels on the reference axle of a vehicle is directed to a vehicle having a geometric center line defined as the line passing through each vehicle axle at a point equidistant from the nearest opposite pair of wheels on that axle, a body center line defined as the longitudinal axis of the frame of the vehicle, a body angle defined as the angle formed by the intersection of the geometric center line and the body center line of the vehicle, and a thrust angle defined as the angle between the geometric center line and a thrust line, the thrust line being defined as a line perpendicular to the average axis of the wheels on a predetermined axle. The method includes the steps of measuring wheel offset distances for a predetermined plurality of wheels of a vehicle under test, measuring wheel alignment angles for at least the wheels on the reference axle of the vehicle under test, determining from the wheel offset distances the body angle of the vehicle, determining from the measured wheel alignment angles the thrust angle of the vehicle under test, and correcting the toe angles of the wheels on the reference axle by the body angle.

In a twelfth aspect of the present invention, a method of adjusting a front axle cradle of a vehicle includes the steps of measuring wheel offset distances for each wheel on the front axle of a vehicle under test, determining a total front axle offset from the measured wheel offset distances, displaying the total front axle offset to the user, and adjusting the cradle taking into account minimization of the total front axle offset.

In a last aspect of the present invention, a method is directed to determining wheel setback for a wheel of a vehicle whose alignment is to be measured, which vehicle has a geometric center line defined as the line passing through each vehicle axle at a point equidistant from the nearest opposite pair of wheels on that axle, a body center line defined as the longitudinal axis of the frame of the vehicle, a body angle defined as the angle formed by the intersection of the geometric center line and the body center line of the vehicle, and at least four wheels. The method includes the steps of measuring wheel alignment angles for at least four wheels of a vehicle under test, measuring wheel offset distances for at least four wheels of the vehicle under test, determining the body angle of the vehicle from the measured wheel offset distances, and calculating the preliminary wheel setback angle independent of any component thereof caused by the body angle.

BRIEF DESCRIPTION OF THE DRAWINGS

FIG. 5 is a side view of a ride height measuring arm used in the present invention;

FIG. 6 is a top view of a pinion used with the ride height measuring arm of FIG. 5;

FIG. 7 is an elevation illustrating the operation of the ride height measuring arm of FIG. 5 and the pinion of FIG. 6;

FIG. 8 is a view similar to FIG. 4 showing the ride height measuring arm of FIG. 5 extended to its measuring position;

Similar reference characters indicate similar parts throughout the several views of the drawings.

DESCRIPTION OF THE PREFERRED EMBODIMENT

Figure 1:
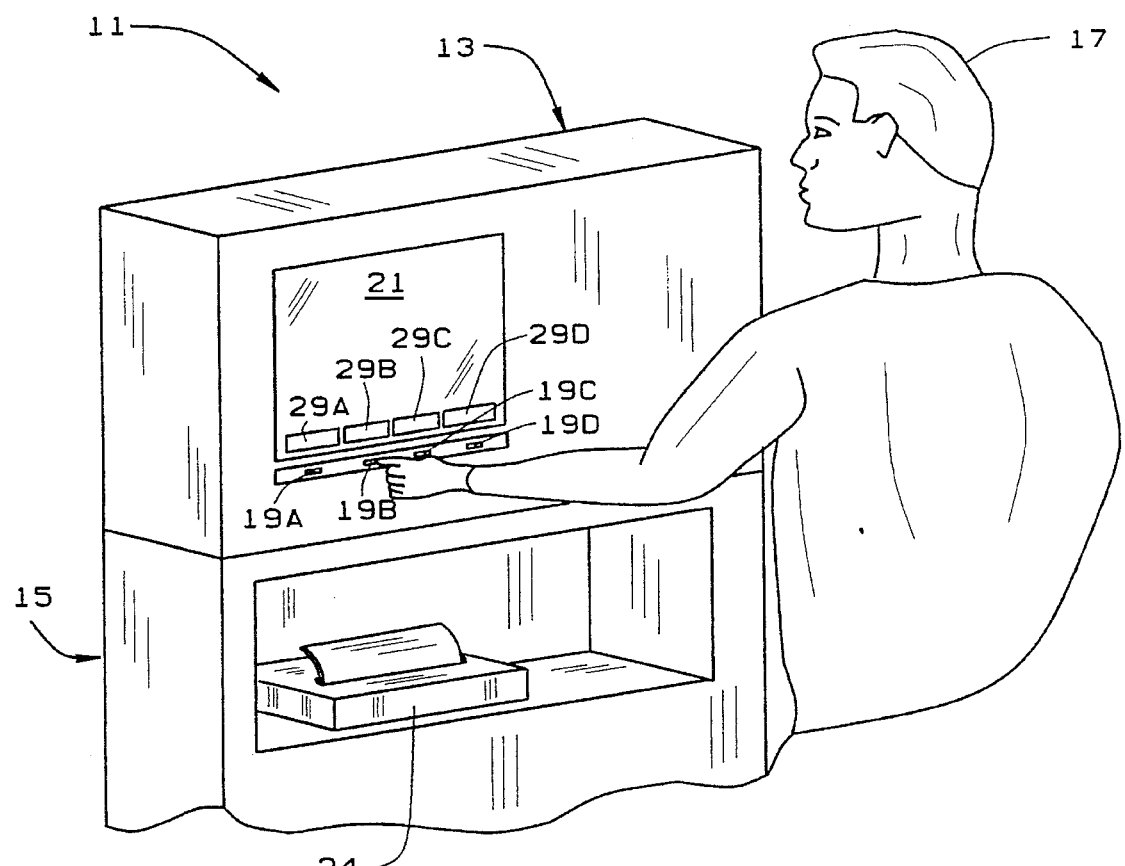
FIG. 1 is a perspective view of a vehicle alignment system console (with a technician/user) usable with the present invention.
Figure 2:
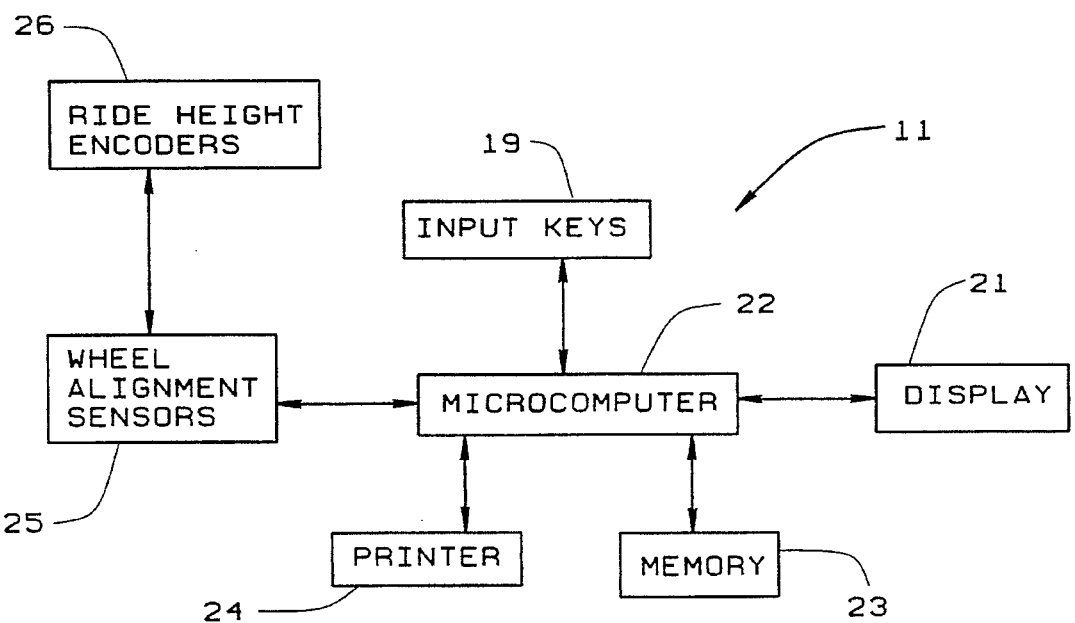
FIG. 2 is a block-diagram of the circuitry of the system of FIG. 1.

Turning to the drawings, and more particularly to FIGS. 1 and 2, there is shown a vehicle wheel alignment system 11 utilizing a ride height/wheel offset measuring apparatus described below. Of course, the particular measuring apparatus is illustrative only. The present invention is not limited to any particular measuring apparatus.

Alignment system 11 includes a console 13 suitably mounted on a stand 15 for use by a technician/user 17. Console 13 includes a set of manually operable input keys or switches 19(A–D) and a display 21.

Input keys 19 and display 21 are connected to a microcomputer 22 which functions as an electronic controller to control the operation of system 11. Any number of different microcomputers may be used in system 11, depending upon the other requirements of the system. Microcomputer 22 is shown in FIG. 2 connected to a digital memory 23, and a printer 24. It should be understood that memory 23 could be internal to microcomputer 22, depending upon the particular microcomputer used. In addition, other peripheral devices (not shown) could be connected to microcomputer 22 as desired.

A plurality of wheel alignment sensors 25 are operatively connected to microcomputer 22 for supplying alignment information to the microcomputer. The use of such sensors to measure alignment characteristics is, of course, well known. See, U.S. Pat. Nos. Re. 33,144 to Hunter et al., 4,319,838 to Grossman et al., 4,381,548 to Grossman et al., and 4,879,670 to Colarelli, the disclosures of which are incorporated herein by reference.

Figure 2A:
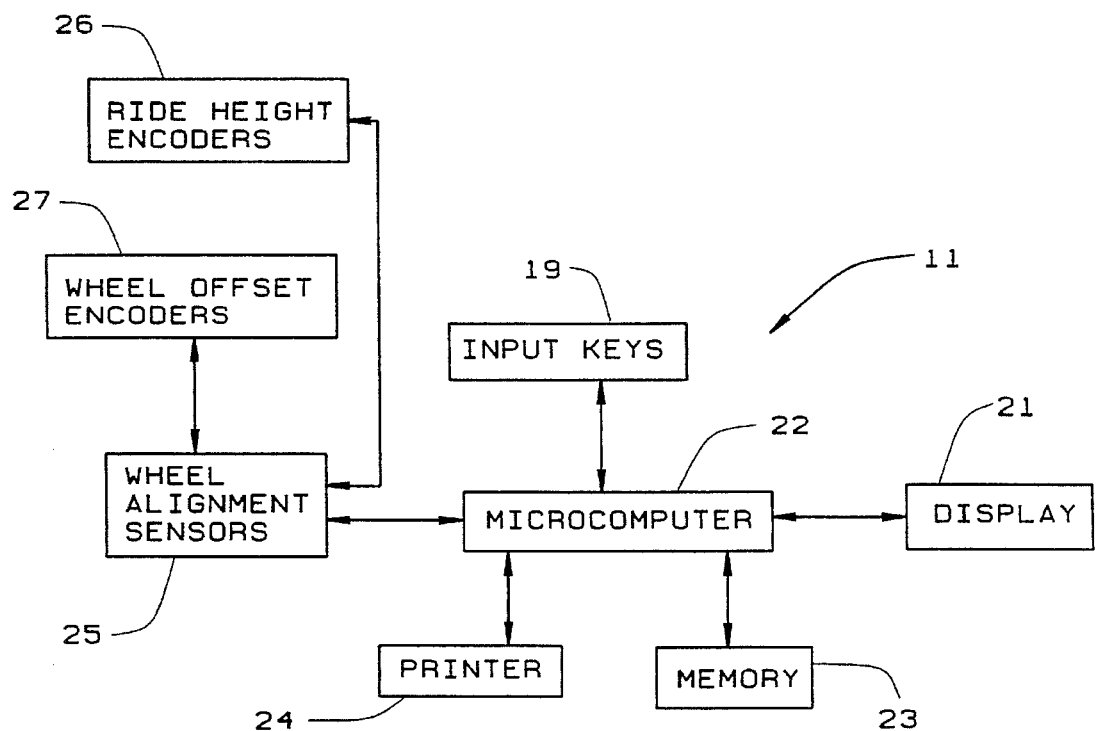
FIG. 2A is a block-diagram similar to FIG. 2 of alternative circuitry of the system of FIG. 1.

Microcomputer 22 is also connected through wheel alignment sensors 25 to a plurality of ride height encoders 26 (discussed below), which system 11 uses to determine the ride height of the vehicle under test. More particularly, there is preferably one ride height encoder per wheel, although the present invention could be implemented using a single encoder which is moved from wheel to wheel, or any variation thereof. As discussed below, a set of wheel offset encoders 27 (FIG. 2A) may also be used to automatically provide wheel offset distances for each wheel to microcomputer 22. Alternatively, the wheel offset distances may be measured as described below and entered manually via input keys 19.

The bottom of display 21 contains four variable function blocks 29A–D (the display of which is controlled by microcomputer 22). Function blocks 29A–D are disposed directly over corresponding switches 19A–D and display to the user the function of those switches at that particular time in the program which controls the operation of microcomputer 22.

Figure 3:
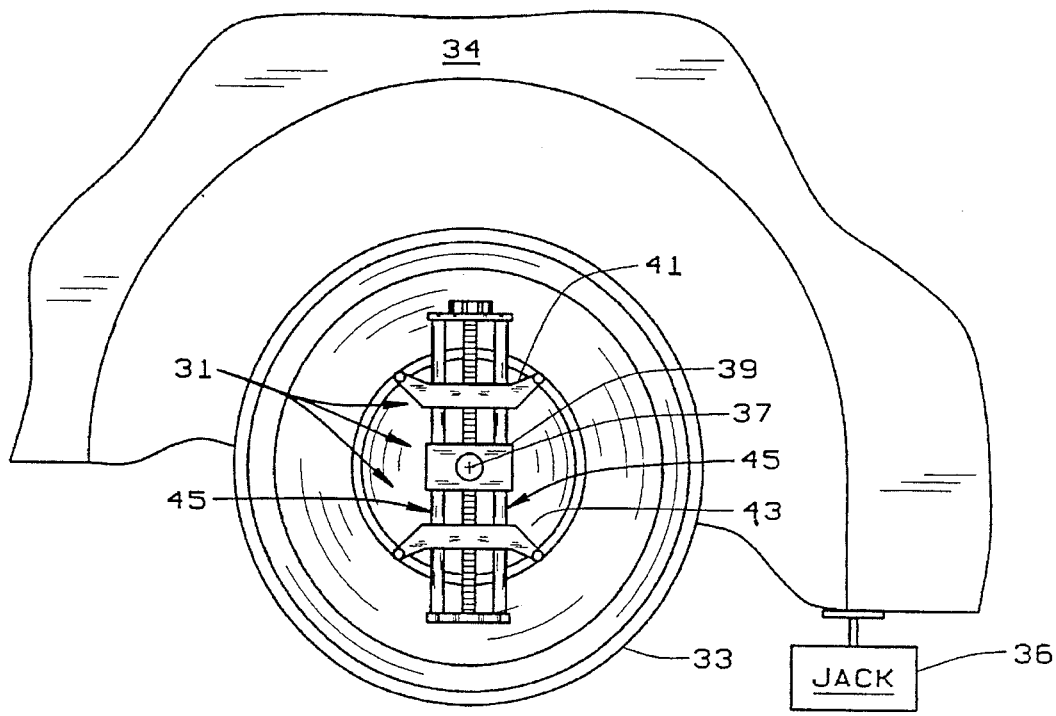
FIG. 3 is a front elevation of an adapter used in the present invention mounted on a wheel/tire assembly of a vehicle whose ride height is to be measured.

Turning to FIGS. 3–8, the present invention includes apparatus which is used to measure both vehicle ride height and wheel offset distances. This apparatus includes an adapter 31 removably mountable on a wheel/tire assembly 33 of a vehicle 34 (only a portion of which is shown in the FIGS.), the wheel/tire assembly being mounted on the vehicle. Such adapters are known in the art, and are conventionally used to mount a sensor housing 35 (FIG. 4) containing wheel alignment sensors 25 in a fixed geometrical relationship with the axis 37 (FIG. 3) of the wheel. Also shown in FIG. 3 is a jack 36 used as part of system 11 to elevate the body of the vehicle with respect to the wheel/tire assembly. Since many different kinds of jacks are conventionally used with alignment equipment, the jack is shown in simplified form.

Adapter 31 is designed to fit numerous sizes of wheels, but is constructed so that its center mounting plate 39 remains centered over wheel axis 37. This is accomplished by moving upper and lower arms 41, 43 along parallel tracks 45 equal distances until the arms are stopped by contact with the wheel. As a result there is always a fixed geometrical relationship between the mounting plate of adapter 31 and the wheel axis.

Adapter 31 has conventionally mounted thereto sensor housing 35 which differs from a conventional wheel alignment sensor housing in that it has a path therein for linear movement of an arm 47. Arm 47 is completely removable from sensor housing 35 (or any equivalent separate housing providing a guide path for the arm) so that the arm may be taken out of the way except for those times when a ride height measurement is being made.

Arm 47 is roughly one and one-half feet in length and includes (see FIG. 5) a lower shaft portion 51 terminating in an upper shaft portion 53, which in turn terminates in a block 55. The two shaft portions are made of glass filled nylon rod (or any other suitable material). The lower shaft portion is machined or molded to have a series of longitudinally disposed rings 57 disposed substantially along the entire length of the lower shaft portion. As a result, the lower shaft portion functions as a rack in a rack and pinion system described below.

Upper shaft portion 53 is of slightly larger diameter than the lower shaft portion so as to provide a shoulder 61 between the two portions. This shoulder provides a natural stop for arm 47, as described below. Of course the bottom portion of lower shaft portion 51 could also serve the function of a stop. Upper shaft portion 53 terminates at its upper end in block 55. The block further serves to mount a finger 63 in fixed geometrical relationship with the shaft. Finger 63 optionally has a clamp 64 secured to the end thereof. As will become apparent, clamp 64 is preferably made of a resilient material so that it may be removably secured to the fender lip of a vehicle under test. Other clamps are, of course, usable with the present invention as well.

The rings 57 on lower shaft portion 51 are evenly spaced to engage the teeth 65 in a pinion 67 (FIGS. 6 and 7) so that linear motion of lower shaft portion 51 along the path in the housing results in corresponding rotation of the pinion. Pinion 67 (see FIG. 7) is operatively connected to encoder 26, so that the output of the encoder is an electrical signal indicative of the movement of lower shaft portion 51 with respect to the housing. It should be noted that since encoder 26 is disposed adjacent the wheel alignment sensors, the same electrical cabling (or other communications channel) may be used to send the signal from the encoder back to the microcomputer that is used to carry the wheel alignment sensor signals.

Figure 4:
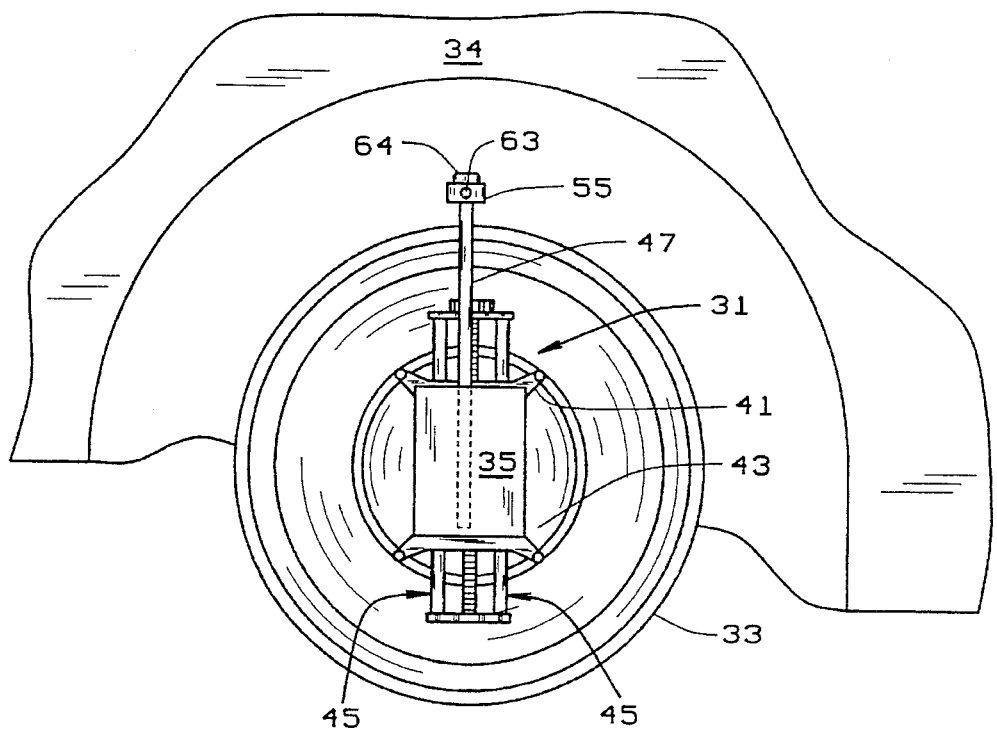
FIG. 4 is a view similar to FIG. 3 showing the ride height measuring apparatus used in the present invention mounted to the adapter of FIG. 3.

In operation, the technician 17 manually takes arm 47 and places it in the path or track in housing 35 and lets the arm move downwardly to its rest position (shown in FIG. 4). The microcomputer observes the output of the ride height encoder 26 during this time and sets the output to zero for all negative readings from the encoder. As the arm is moved downwardly, all the readings are negative, so the measurement starts off from zero at the bottom of the path of movement of the arm. The arm is rotated so that the finger 63 faces toward the vehicle (as shown in FIG. 8) or to some other desired measuring position. It is preferred that finger 63 be movable horizontally with respect to block 55 for reasons which are explained below. As the arm is moved upwardly with respect to the sensor housing, finger 63 is moved horizontally toward the vehicle by the user until it engages the wheel arch of vehicle 34, at which point further upward movement of the arm is halted. At this time, clamp 64 may be suitably engaged to the fender lip of the vehicle to hold both finger 63 and arm 47 in place with respect to the vehicle body. This allows the technician/user free use of his hands while at the same time allowing continuous measurement of ride height and/or wheel offset distances if desired.

Microcomputer 22 keeps track of the output from encoder 26 as the arm is moved vertically upwardly along the path from its rest position to the extended position (shown in FIG. 8) in which the finger engages the wheel arch. Once the pulses from the encoder stop (i.e., no further pulses are received over a predetermined time interval), microcomputer 22 concludes that the finger has engaged the wheel arch. The number of pulses from the encoder during this movement is directly proportional to the distance traveled by the arm. The microcomputer converts the encoder pulses to a distance of arm travel. Since the arm in its rest position is in fixed geometrical relationship with the wheel axis independent of the type or size of wheel, the distance of arm travel determined by the microcomputer differs from the ride height by a constant, namely the fixed vertical distance between the wheel axis and the top of finger 63 when the arm is in its rest position. Microcomputer 22, therefore, adds the fixed distance to the measured distance of travel of the arm to obtain the ride height.

Once the microcomputer determines the ride height, it is displayed on display 21 or printed in a report on printer 24 (if desired). Of course, wheel alignment data can be displayed or reported at the same time. It is also preferred that memory 23 have stored therein ride height specifications for various vehicles, so that these specifications may be compared by microcomputer 22 with the measured ride height value. If those ride height specifications as supplied from the manufacturer are for a distance other than wheel-arch-to-wheel-axle, those specifications are converted to corresponding wheel-arch-to-wheel-axle specifications before storage in memory 23.

Once all the ride height measurements are taken, the clamp 64 may be removed from the fender lip and the arm may be moved back down to its rest position (FIG. 4). If necessary, the arm may be rotated to prevent interference between finger 63 and the vehicle body before the measuring arm is moved vertically upwardly until it is completely removed from the sensor housing. This prevents ride height arm 47 from interfering with any subsequent use of the wheel alignment sensors.

Figure 9:
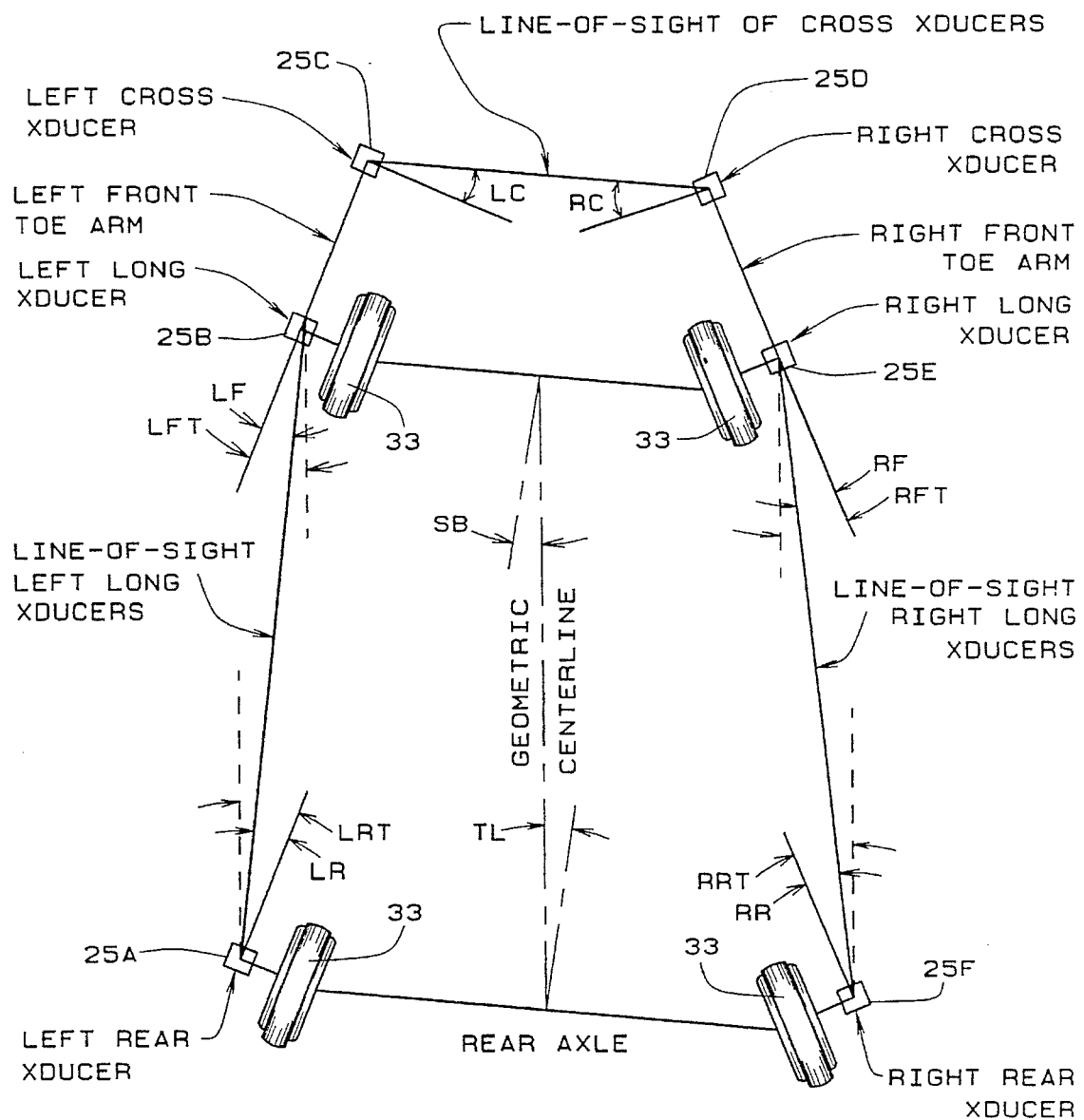
FIG. 9 is a graphical representation of a four-wheeled vehicle illustrating the placement of the wheel alignment sensors.

It should be understood that a vehicle alignment system 11 preferably includes six angle sensors 25A–25F as indicated in FIG. 9 for measuring the various alignment angles of the vehicle. Such measurements and angles are explained in detail in co-assigned U.S. Pat. No. 4,319,838 to Grossman et al. incorporated herein by reference. In particular, the system preferably includes a pair of toe sensors 25C and 25D, associated with the front wheels of the vehicle, along with four additional sensors associated with each wheel. In addition, the present system includes ride height sensor encoders 26 as explained above and wheel offset distance measuring devices associated with each wheel as explained below.

Figure 10:
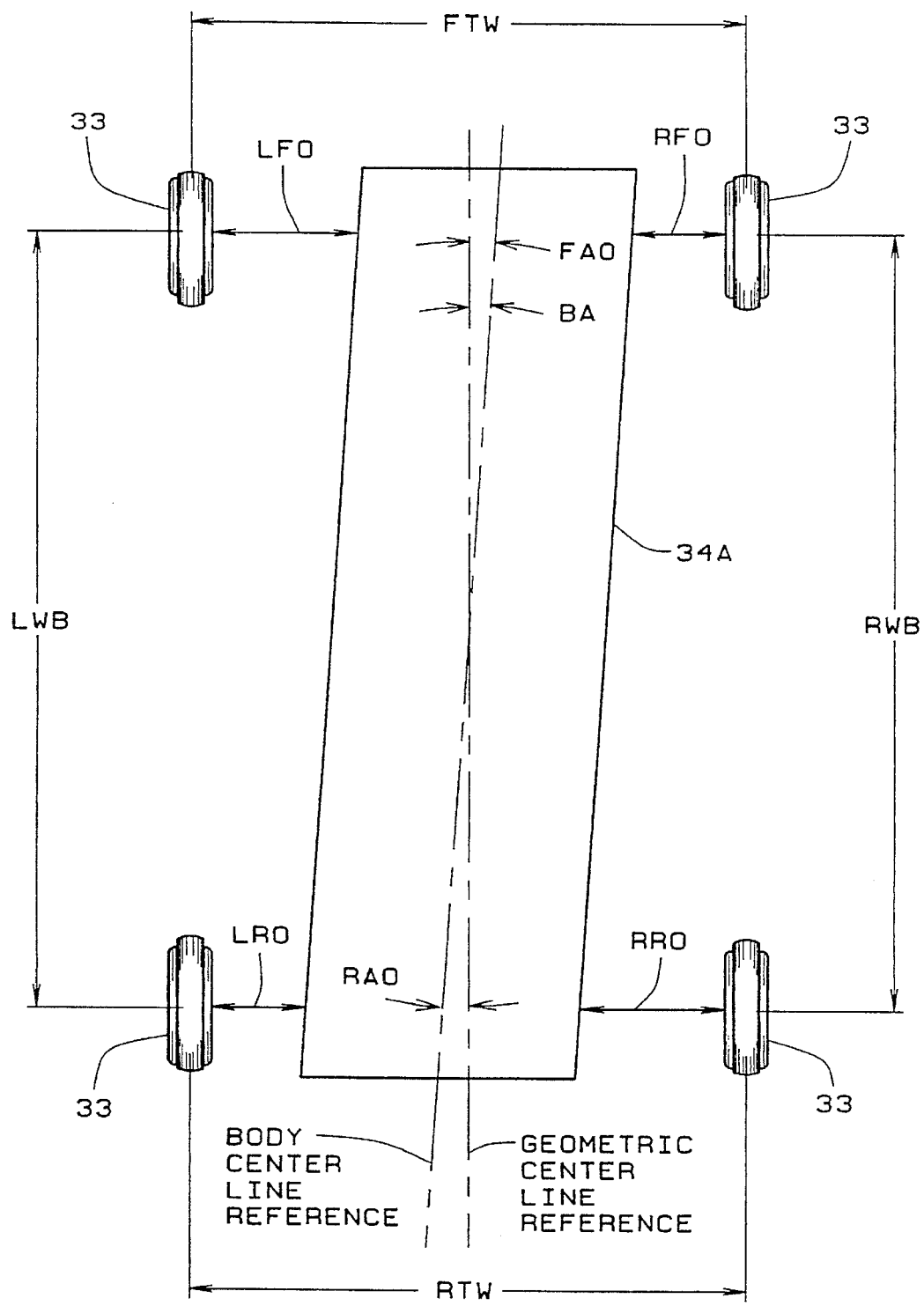
FIG. 10 is a graphical representation similar to FIG. 9 illustrating various measurements used in determining the body angle of a vehicle under test.

Note that as shown in FIG. 9, the conventional reference for the various vehicle alignment angles is the geometric center line Of the vehicle. This is a line defined with respect to the wheels of the vehicle. More particularly the geometric center line is defined as the line passing through each vehicle axle (in a two-axle vehicle) at a point equidistant from the nearest opposite pair of wheels on that axle. As can be seen in FIG. 10, the geometric center line does not necessarily coincide with the body center line of the vehicle. The body center line is defined with respect to the frame of the vehicle, and specifically is the longitudinal axis of the frame of the vehicle. The body center line is, therefore, the line defined by the midpoints of the frame measured along the tow axles of the vehicle shown in FIG. 10. For automobiles and light trucks, the frame itself is not generally readily accessible, but the body 34A of the vehicle is. Particularly the wheel arches of the vehicle are readily accessible to the user and bear a fixed relationship to the frame.

As discussed above, finger 63 is brought into contact with the wheel arch for each wheel in measuring ride height. It is preferred that finger 63 also be used for measuring the wheel offset distances RFO (right front offset), LFO (left front offset), RRO (right rear offset), and LRO (left rear offset) for each wheel. These offset distances are defined as the lateral offset between the axis of the ride height sensor arm and the corresponding fender lip immediately above the axle of the wheel. That is, the lateral offset for each wheel is the distance between the corresponding sensor arm 47 and the fender lip. As explained below, these offset distances in combination with the wheelbase of the vehicle (shown in FIG. 10 as RWB (right wheelbase) and LWB (left wheelbase), are used by microcomputer 22 to determine the body center line, and more particularly to determine the body angle BA of the vehicle. The body angle is defined as the angle formed by the intersection of the geometric center line and the body center line of the vehicle.

Figure 11:
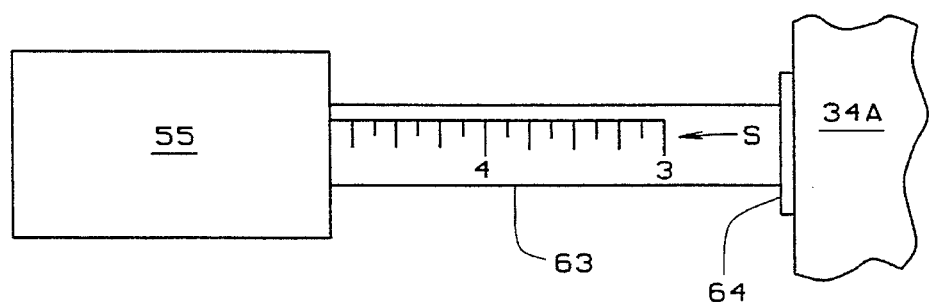
FIG. 11 is a top plan of the apparatus of FIG. 5 with the background broken away for clarity, illustrating one method of obtaining wheel offset distances in the present invention.

Turning to FIG. 11, finger 63 is preferably provided with a scale S imprinted on its upper surface so that as more of the finger is slid out of block 55 more of the scale is exposed. The user upon attaching finger 63 to the wheel arch 34A by means of clamp 64 readily reads from the scale the corresponding wheel offset distance for that particular wheel from scale S. The user inputs this value (and the values for the other wheels) to microcomputer 22 using input keys 19. It should be understood that the particular scale shown in FIG. 11 is illustrative only.

As an alternative to the manually read scale in FIG. 11, the wheel offset distances may be read using an encoder arrangement such as described above for ride height. In this embodiment, finger 63 may be grooved to form the rack portion of a rack and pinion encoder, or the finger may be mechanically attached by means of a wire and pulley arrangement to an encoder disposed in sensor housing 35. In any event it is preferred that the wheel offset distance measuring device be attached to the ride height apparatus so that ride height measurements and wheel offset distance measurements may be acquired at the same time.

Figure 12:
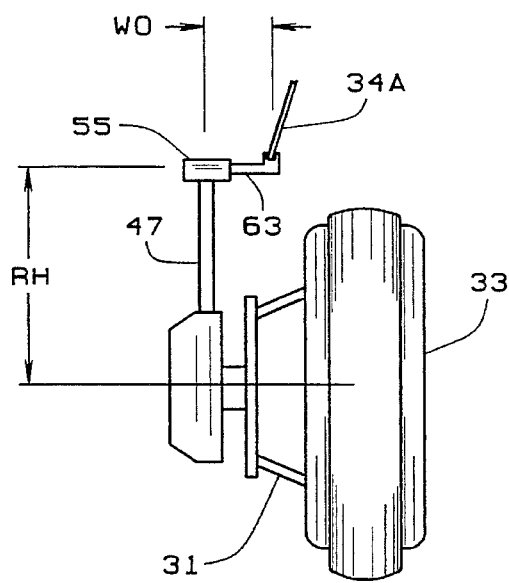
FIG. 12 is a front elevation of a vehicle wheel and corresponding fender lip undergoing the measurements used in the present invention to determine ride height and wheel offset distance.

The ride height measurement (RH) and wheel offset measurement (WO) for each wheel 33 is illustrated in FIG. 12. It should be understood that FIG. 12 illustrates the offset distance measured with respect to the sensor arm 47, not with respect to the wheel, although as noted above these are equivalent.

Figure 13:
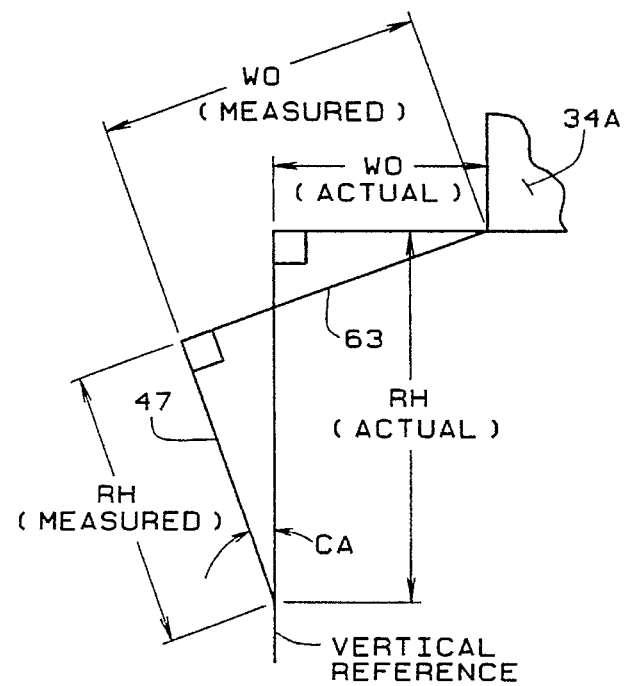
FIG. 13 is a graphical representation of the apparatus of FIG. 12 illustrating the effect of wheel camber on the measurements.

There is another variation in both ride height and wheel offset distance which is not fixed, however. That variation arises from the actual camber angle CA of the wheel (uncompensated for run out) with respect to which the ride height and wheel offset are being measured. As can be seen in FIG. 13, the ride height measured by arm 47 can differ from the actual ride height because of the camber angle CA of the tire. Similarly, the measured wheel offset can differ from the actual wheel offset because of the same effect. Fortunately, the camber angle is known (from wheel alignment sensors 25) so the actual ride height and wheel offset distances may be computed by microcomputer 22. It has been found that compensation may be accomplished using the following equations, which are programmed into microcomputer 22:

$$RH(actual)=RH(measured)*cos(CA)+WO(measured)*sin(CA)$$

$$WO(actual)=WO(measured)*cos(CA)-RH(measured)*sin(CA).$$

It is preferred that these compensated values for ride height and wheel offset distance be used, although such compensation is not required in all instances. Note as well that cos(CA) will be close to 1 for most values of camber encountered, so that it may safely be set equal to 1 for most applications.

Referring back to FIG. 10, once the various wheel offset distances (RFO, LFO, RRO, and LFO) are acquired as described above and compensated for camber if desired, offset distances for the front and rear axles can be calculated. Microcomputer 22 calculates front axle offset (FAO) and the rear axle offset (RAO) as follows:

$$FAO=(RFO-LFO)/2$$

$$RAO=(RRO-LRO)/2.$$

Front axle offset is defined as positive when the axle midpoint is to the right of the body midpoint (as measured at the front axle). Rear axle offset is defined as positive when the rear axle midpoint is to the right of the body midpoint (as measured at the rear axle).

Once the axle offsets are calculated, the microcomputer 22 has all the information it needs to determine the body angle except for the wheelbase (WB) of the vehicle. This may be manually measured and entered by the technician/ user, or may be electronically measured and entered by circuitry not shown, or may be recalled from memory. As indicated in FIG. 10, typically the wheelbase is measured on both the right and left sides of the vehicle and the resulting measurements LWB and RWB are averaged to obtain the wheelbase WB for the vehicle. The body angle BA is calculated by microcomputer 22 from the axle offsets FAO and RAO and from the wheelbase WB using the following equation:

$$BA=arctan((RAO-FAO)/WB).$$

This angle is defined as positive when the rear axle offset is greater than the front axle offset (as shown in FIG. 10).

Figure 14:
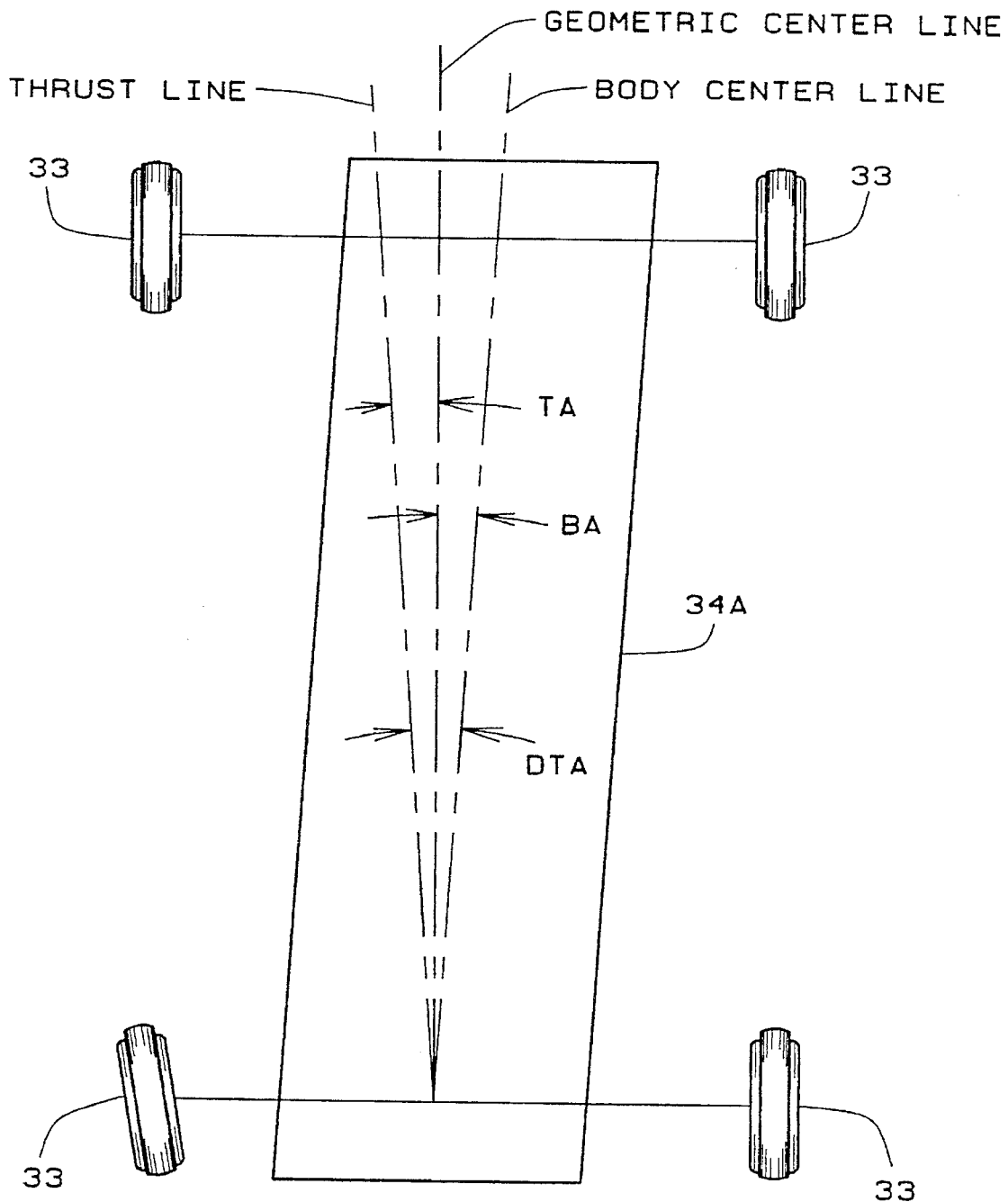
FIG. 14 is a graphical representation similar to FIG. 10 illustrating a dog track angle for a vehicle.

Another angle of interest in aligning a vehicle is the dog track angle, which is the angle formed by the intersection of the body center line and the thrust line. See FIG. 14. This angle is defined as positive when the body center line is to the right of the thrust line in FIG. 14. The dog track angle (DTA) equals the body angle (BA) minus the thrust angle (TA), as illustrated in FIG. 14. The present apparatus computes both the body angle and the thrust angle, but other non-wheel alignment apparatus available in collison repair shops may be used to obtain the body angle directly. In that case, the body angle may be measured by that other apparatus and manually entered into the present system to determine the dog track angle. No matter how determined, the dog track angle is displayed to the user on display 21 after it is calculated by microcomputer 22. If the reference axle (the rear axle in FIG. 14) is adjustable, then knowledge of the body angle BA can be used to correct the dog track angle. Specifically, by applying the body angle to the left and right individual rear toe alignment angles, adjustment of the thrust angle to zero causes the dog track angle to become zero as well. The left rear toe is adjusted by subtracting therefrom the body angle, while the right rear toe is adjusted by adding thereto the body angle. This adjustment has no effect on total toe (left rear toe plus right rear toe), but changes the thrust angle by the body angle BA. Of course, the converse can also be done where the applicable equipment is available. For example, in body shops the body angle BA can be adjusted (as measured by the apparatus of the present invention) until the corrected thrust angle becomes zero.

Although heretofore the wheel offset distances of all four wheels have been used, the present invention is not so limited. It has been found that the front axle offset, determined as described above, is useful for alignment operations which do not require determination of the body angle. For example, in front wheel drive vehicles, it is necessary to adjust the cradle on occasion. It is desirable in making this adjustment to minimize the front axle offset FAO. For this reason, front axle offset is displayed by system 11 on display 21 for use by the technician/user in adjusting the cradle. It is also desirable to minimize side to side SAI/included angle differences, and thrust angle at the same time to the extent possible. These angles are displayed on display 21 for the user as well.

Figure 15:
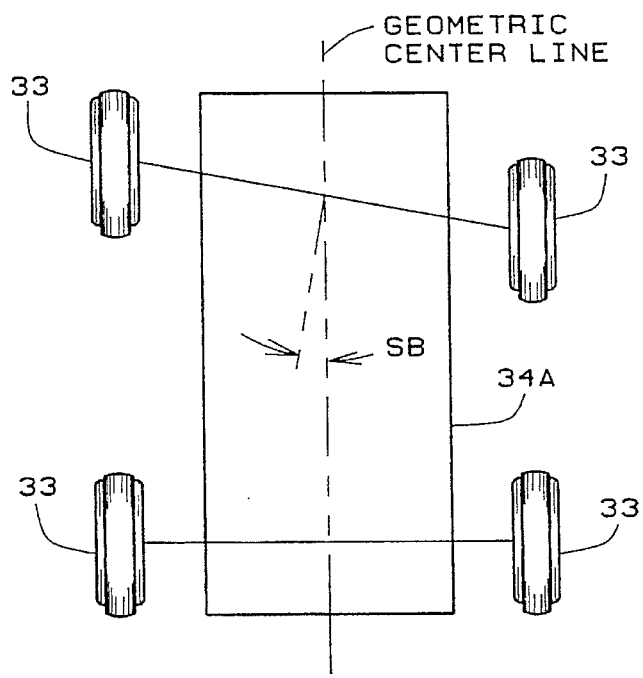
FIG. 15 is a graphical representation similar to FIG. 10 illustrating wheel setback for the front axle of a vehicle.
Figure 16:
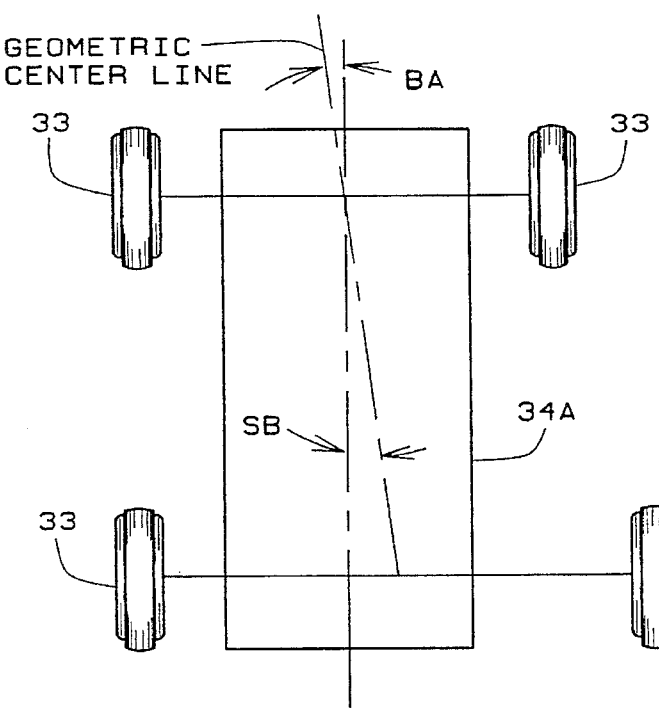
FIG. 16 is a graphical representation similar to FIG. 15 illustrating the mimicking of a wheel setback condition caused by wheel offset in the rear axle.

As can be seen in FIG. 9, it has been known that a setback angle SB may occur in a vehicle due to relative forward or aft positioning of one wheel on an axle with respect to the other wheel or wheels on that axle. This situation is illustrated in its simplest form in FIG. 15. The setback angle SB is conventionally measured with respect to the geometric center line and is the angle between that line and a line perpendicular to the line of sight between the wheels on the axle in question. Note, however, that as illustrated in FIG. 16 measuring the setback angle in this way can result in a setback angle which is actually due to wheel offset.

With the present apparatus one can correct the measured setback angle for any component thereof due to wheel offset to reflect only the true setback condition, giving an angle SB(corrected) which is independent of any axle offset condition. Microcomputer 22 accomplishes this by subtracting the body angle BA from the measured setback angle SB to obtain the corrected angle SB(corrected), i.e., $$SB(\text{corrected}) = SB - BA.$$

Figure 17:
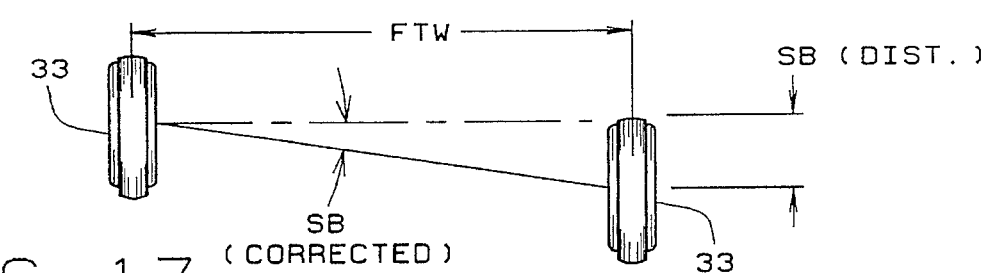
FIG. 17 is a graphical representation illustrating the determination of a setback distance from the corrected setback angle.

Once the corrected setback angle is obtained, microcomputer 22 computes and displays on display 21 the actual setback distance (see FIG. 17) corresponding to the corrected setback angle. This computation requires the front track width (FTW) of the vehicle, which may be measured and input manually by the technician/user, or may be measured and entered automatically by electronic circuitry not shown, or may be recalled from memory. The microcomputer computes the setback distance SB(dist.) from the formula:

$$SB(\text{dist.}) = FTW * \tan(SB(\text{corrected})).$$

In those situations where the rear setback angle can be measured (i.e., where the alignment equipment uses eight toe transducers), the same computations set forth above with respect to front setback are performed by microcomputer 22 for rear setback.

In view of the above, it will be seen that the various objects and features of the present invention are achieved and other advantageous results obtained. The description of the present invention contained herein is intended to be illustrative and not to be taken in a limiting sense.

What is claimed is:

1. A vehicle wheel alignment apparatus for use with a land vehicle having at least four wheels, comprising:

wheel alignment sensors for obtaining wheel alignment data, said data including measured camber data for at least some of the wheels of a land vehicle under test;

offset measuring means for measuring wheel offset distances;

controller means operatively connected to the wheel alignment sensors and to the offset measuring means for compensating the measured wheel offset distances for the camber of the corresponding wheels, for determining a reference from the compensated wheel offset distances, and for calculating wheel alignment angles with respect to the reference from the wheel aligment data; and a display under control of the controller for displaying information concerning the wheel alignment angles to a user to assist the user in aligning the vehicle.

2. The vehicle wheel alignment apparatus as set forth in claim 1 wherein the offset measuring means includes means for automatically supplying the measured wheel offset distances to the controller means.

3. The vehicle wheel alignment apparatus as set forth in claim 1 wherein the wheel alignment sensors include ride height sensors for measuring the ride height of the vehicle at the wheels thereof, said controller means compensating each wheel offset distance as a function of the measured camber, the measured wheel offset distance, and the measured ride height for said wheel.

4. The vehicle wheel alignment apparatus as set forth in claim 1 wherein the offset measuring means includes means for removably securing a portion of the offset measuring means to a portion of the body of the vehicle under test.

5. The vehicle wheel alignment apparatus as set forth in claim 1 wherein the controller means further includes means for determining an axle offset for at least one axle from the wheel offset distances for wheels on said axle.

6. The vehicle wheel alignment apparatus as set forth in claim 5 further including display means for displaying indicia to a user representative of the axle offset.

7. The vehicle wheel alignment apparatus as set forth in claim 1 wherein the vehicle has a geometric longitudinal center line defined as the line passing through each vehicle axle at a point equidistant from the nearest opposite pair of wheels on said axle, wherein the vehicle has a body center line defined as the longitudinal axis of the frame of the vehicle, and wherein the vehicle has a body angle defined as the angle formed by the intersection of the geometric center line and the body center line of the vehicle, further including means for obtaining a wheelbase value for the vehicle under test, said controller means further including means for determining the body angle from the wheelbase value and the offset distances.

8. The vehicle wheel alignment apparatus as set forth in claim 7 wherein the vehicle has a thrust angle defined as the angle between the geometric center line and a thrust line, said thrust line being defined as a line perpendicular to the average axis of the wheels on a predetermined axle, said controller means being responsive to the wheel alignment sensors to determine the thrust angle, and further including means for determining the difference between the body angle and the thrust angle and for displaying said difference.

9. A method of assisting a user in aligning land vehicles having at least four wheels, comprising the steps of:

measuring wheel alignment angles, including camber, for at least some of the wheels of a land vehicle under test;

measuring wheel offset distances for at least two of said wheels on a predetermined axle;

compensating the measured wheel offset distances for the camber of the corresponding wheels;

determining a reference from the compensated wheel offset distances;

calculating wheel alignment angles with respect to the reference from the wheel alignment data; and displaying information concerning the wheel alignment angles to a user to assist the user in aligning the vehicle.

10. The method of aligning vehicles as set forth in claim 9 including the step of measuring the ride height of the vehicle at the wheels thereof, and wherein the compensating step includes compensating each wheel offset distance as a function of the measured camber, the measured wheel offset distance, and the measured ride height for said wheel.

11. The method of aligning vehicles as set forth in claim 9 wherein the offset distance measuring step includes the step of removably securing an offset measuring device to a portion of the body of the vehicle under test.

12. The method of aligning vehicles as set forth in claim 9 further including the step of determining an axle offset for at least one axle from the wheel offset distances for wheels on said axle.

13. The method of aligning vehicles as set forth in claim 12 further including displaying indicia to a user representative of the axle offset.

14. The method of aligning vehicles as set forth in claim 9 wherein the vehicle has a geometric longitudinal center line defined as the line passing through each vehicle axle at a point equidistant from the nearest opposite pair of wheels on said axle, wherein the vehicle has a body center line defined as the longitudinal axis of the frame of the vehicle, and wherein the vehicle has a body angle defined as the angle formed by the intersection of the geometric center line and the body center line of the vehicle, further including the steps of obtaining a wheelbase value for the vehicle under test and determining the body angle from the wheelbase value and the offset distances.

15. The method of aligning vehicles as set forth in claim 14 wherein the vehicle has a thrust angle defined as the angle between the geometric center line and a thrust line, said thrust line being defined as a line perpendicular to the average axis of the wheels on a predetermined axle, further including the steps of determining the thrust angle from the measured wheel alignment angles, determining the difference between the body angle and the thrust angle, and displaying said difference to a user.

16. A vehicle wheel alignment apparatus having the capability of determining vehicle ride height, comprising:

wheel alignment sensors for obtaining wheel alignment data, said data including measured camber data for at least some of the wheels of a land vehicle under test;

at least one ride height sensor for measuring the ride height of the vehicle at a wheel of said vehicle;

controller means operatively connected to the wheel alignment sensors and to the ride height sensor for compensating the measured ride height for camber of the wheel corresponding to the measured ride height; and a display under control of the controller for displaying information concerning the compensated ride height to a user.

17. The vehicle wheel alignment apparatus as set forth in claim 16 wherein the ride height sensor includes a wheel offset sensor secured thereto for measuring the wheel offset distance of the wheel corresponding to the measured ride height, said controller means being responsive to the measured wheel offset distance to further compensate the measured ride height for wheel offset distance.

18. A method of compensating ride height measurements in connection with aligning land vehicles, comprising the steps of:

measuring camber for at least one of the wheels of a vehicle under test;

measuring the ride height of the vehicle at said wheel of said vehicle; and compensating the measured ride height for camber of the wheel corresponding to the measured ride height.

19. The method of aligning vehicles as set forth in claim 18 further including the step of measuring the wheel offset distance of the wheel corresponding to the measured ride height and further compensating the measured ride height for wheel offset distance.

20. A vehicle wheel alignment apparatus for determining a characteristic related to vehicle body center line, said apparatus being for use with a land vehicle having a frame with a longitudinal axis defining the body center line of the vehicle and at least four wheels, said apparatus comprising:

offset measuring sensors for measuring a wheel offset distance for each of at least four wheels of a vehicle under test, each offset measuring sensor being disposed so as to measure the corresponding wheel offset distance generally in a vertical plane containing the axle of the wheel whose offset distance is being measured;

means for determining from offset distance measurements for at least four predetermined wheels a characteristic related to the body center line of the vehicle under test.

21. The vehicle wheel alignment apparatus as set forth in claim 20 wherein the offset measuring sensors are disposed so as to measure the wheel offset distances generally above the axles of their corresponding wheels.

22. The vehicle wheel alignment apparatus as set forth in claim 20 wherein the offset measuring sensors include means for automatically supplying the measured wheel offset distances to the determining means.

23. The vehicle wheel alignment apparatus as set forth in claim 20 wherein the offset measuring means includes means for removably securing a portion of the offset measuring means to a portion of the body of the vehicle under test.

24. The vehicle wheel alignment apparatus as set forth in claim 20 wherein the determining means further determines an axle offset for at least one axle from the wheel offset distances for wheels on said axle, further including display means for displaying indicia to a user representative of the axle offset.

25. The vehicle wheel alignment apparatus as set forth in claim 20 wherein the vehicle has a geometric longitudinal center line defined as the line passing through each vehicle axle at a point equidistant from the nearest opposite pair of wheels on said axle, and wherein the vehicle has a body angle defined as the angle formed by the intersection of the geometric center line and the body center line of the vehicle, further including means for obtaining a wheelbase value for the vehicle under test, said determining means further including means for determining the body angle from the wheelbase value and the offset distances.

26. The vehicle wheel alignment apparatus as set forth in claim 25 wherein the vehicle has a thrust angle defined as the angle between the geometric center line and a thrust line, said thrust line being defined as a line perpendicular to the average axis of the wheels on a predetermined axle, said determining means being responsive to the wheel alignment sensors to determine the thrust angle, and further including means for determining the difference between the body angle and the thrust angle and display means for displaying to a user indicia representative of said difference.

27. A method of determining a characteristic related to vehicle body center lines for use in aligning land vehicles, comprising the steps of:

measuring a wheel offset distance for each of at least four wheels of a land vehicle under test, each offset distance measurement being taken generally in a vertical plane containing the axle of the wheel whose offset distance is being measured;

determining from said offset distance measurements for at least four predetermined wheels a characteristic related to the body center line of the vehicle under test.

28. The method of aligning vehicles as set forth in claim 27 further including the step of determining an axle offset for at least one axle from the wheel offset distances for wheels on said axle and displaying indicia to a user representative of the axle offset.

29. The method of aligning vehicles as set forth in claim 27 wherein the vehicle has a geometric longitudinal center line defined as the line passing through each vehicle axle at a point equidistant from the nearest opposite pair of wheels on said axle, and wherein the vehicle has a body angle defined as the angle formed by the intersection of the geometric center line and the body center line of the vehicle, further including obtaining a wheelbase value for the vehicle under test and determining the body angle from the wheelbase value and the offset distances.

30. The method of aligning vehicles as set forth in claim 29 wherein the vehicle has a thrust angle defined as the angle between the geometric center line and a thrust line, said thrust line being defined as a line perpendicular to the average axis of the wheels on a predetermined axle, further including the steps of determining the thrust angle, determining the difference between the body angle and the thrust angle, and displaying to a user indicia representative of said difference.

31. A vehicle wheel alignment apparatus determining a characteristic related to vehicle body center line, said apparatus being for use with a land vehicle having a frame with a longitudinal axis defining the body center line of the vehicle and at least four wheels, comprising:

offset measuring sensors for measuring a wheel offset distance for each of at least four wheels of a land vehicle under test;

means for correcting the wheel offset distances for any inclination from horizontal of the planes in which the wheel offset distances were measured and for determining from the corrected wheel offset distances a characteristic related to the body center line of the vehicle under test.

32. A vehicle wheel alignment apparatus for determining a characteristic related to vehicle body center line, said apparatus being for a land vehicle having a frame with a longitudinal axis defining the body center line of the vehicle, and at least four wheels, comprising:

offset measuring sensors for measuring for each wheel a wheel offset distance from said wheel to a frame reference point for said wheel, said frame reference point being disposed in a plane above the corresponding wheel;

means for determining from the measured wheel offset distances for at least four predetermined wheels a characteristic related to the body center line of the land vehicle under test.

33. A vehicle wheel alignment apparatus for determining a characteristic related to vehicle body center line, said apparatus being for a land vehicle having a frame with a longitudinal axis defining the body center line of the vehicle, and at least four wheels, comprising:

wheel alignment sensors for obtaining wheel alignment data;

ride height sensor means for measuring the ride height of the land vehicle at each of at least four wheels of the vehicle, said ride height sensor means further including wheel offset sensor means secured thereto for measuring wheel offset distances for each of said four wheels;

means responsive to the wheel alignment sensors and the ride height sensor means for determining a characteristic related to the body center line of the vehicle under test.

34. A vehicle wheel alignment apparatus for determining vehicle dog track angle, said apparatus being for use with a land vehicle having a geometric center line defined as the line passing through each vehicle axle at a point equidistant from the nearest opposite pair of wheels on said axle, a body center line defined as the longitudinal axis of the frame of the vehicle, a body angle defined as the angle formed by the intersection of the geometric center line and the body center line of the vehicle, a thrust angle defined as the angle between the geometric center line and a thrust line, said thrust line being defined as a line perpendicular to the average axis of the wheels on a predetermined axle, and at least four wheels, said apparatus comprising:

wheel alignment sensors for obtaining wheel alignment data;

offset measuring means for measuring wheel offset distances;

means for supplying a wheelbase value for the land vehicle under test;

angle determining means responsive to the wheel alignment sensors and to the supplied wheelbase value for determining the body angle from the wheelbase value and the offset distances, said angle determining means being further responsive to the wheel alignment sensors to determine the thrust angle and to determine therefrom the difference between the body angle and the thrust angle, said difference being defined as a dog track angle for the vehicle; and means responsive to the angle determining means for displaying indicia representative of the dog track angle to the user.

35. A method of correcting measured angles in connection with adjusting the alignment of wheels on a reference axle of a land vehicle, said vehicle having a geometric center line defined as the line passing through each vehicle axle at a point equidistant from the nearest opposite pair of wheels on said axle, a body center line defined as the longitudinal axis of the frame of the vehicle, a body angle defined as the angle formed by the intersection of the geometric center line and the body center line of the vehicle, and a thrust angle defined as the angle between the geometric center line and a thrust line, said thrust line being defined as a line perpendicular to the average axis of the wheels on a predetermined axle, said method comprising:

measuring wheel offset distances for a predetermined plurality of wheels of a land vehicle under test;

measuring wheel alignment angles for at least the wheels on the reference axle of the vehicle under test, said measured wheel alignment angles including toe angles of the wheels on the reference axle;

determining from said wheel offset distances the body angle of the vehicle;

determining from the measured wheel alignment angles the thrust angle of the vehicle under test;

correcting the toe angles of the wheels on the reference axle by the body angle.

36. The method of adjusting the alignment of wheels on the driving axle of a vehicle as set forth in claim 35 wherein the step of correcting the toe angles includes changing the individual toe angles on said wheels by the body angle.

37. A method of adjusting a front axle cradle of a land vehicle, comprising:

measuring wheel offset distances for each wheel on the front axle of a land vehicle under test;

determining a total front axle offset from the measured wheel offset distances;

displaying the total front axle offset to the user;

adjusting the cradle taking into account minimization of the total front axle offset.

38. The method of adjusting a front axle cradle of a vehicle as set forth in claim 37 further including the steps of determining the vehicle thrust angle, determining a vehicle side to side steering axis inclination angle, determining a vehicle included angle, and displaying said angles to the user for use in adjusting the cradle to minimize said angles in combination with minimizing total front axle offset.

39. A method of determining wheel setback for a wheel of a land vehicle whose alignment is to be measured, said vehicle having a geometric center line defined as the line passing through each vehicle axle at a point equidistant from the nearest opposite pair of wheels on said axle, a body center line defined as the longitudinal axis of the frame of the vehicle, a body angle defined as the angle formed by the intersection of the geometric center line and the body center line of the vehicle, and at least four wheels, said method comprising:

measuring wheel alignment angles for at least four wheels of a land vehicle under test;

measuring wheel offset distances for at least four wheels of the vehicle under test;

determining the body angle of the vehicle from the measured wheel offset distances;

calculating a corrected wheel setback angle which is independent of any component of wheel setback caused by the body angle.

40. The method of determining wheel setback as set forth in claim 39 further including the steps of:

obtaining data representative of the track width of the vehicle for the axle corresponding to the calculated wheel setback angle;

determining a setback distance for said axle from the corrected wheel setback angle and the corresponding track width;

displaying the determined setback distance to a user.

41. A vehicle wheel alignment apparatus for determining vehicle dog track angle, said apparatus being for use with a land vehicle having a geometric center line defined as the line passing through each vehicle axle at a point equidistant from the nearest opposite pair of wheels on said axle, a body center line defined as the longitudinal axis of the frame of the vehicle, a body angle defined as the angle formed by the intersection of the geometric center line and the body center line of the vehicle, a thrust angle defined as the angle between the geometric center line and a thrust line, said thrust line being defined as a line perpendicular to the average axis of the wheels on a predetermined axle, and at least four wheels, said apparatus comprising:

wheel alignment sensors for obtaining wheel alignment data;

means for supplying a wheelbase value for the land vehicle under test;

means for manually supplying a body angle for the vehicle;

means responsive to the wheel alignment sensors, to the supplied wheelbase value, to the supplied body angle to determine therefrom the difference between the body angle and the thrust angle, said difference being defined as a dog track angle for the vehicle; and means responsive to the angle determining means for displaying indicia representative of the dog track angle to the user.

* * * * *